United States Patent [19]

Camp, Jr. et al.

[11] Patent Number: 5,243,302
[45] Date of Patent: Sep. 7, 1993

[54] VOLTAGE CONTROLLED OSCILLATOR WITH CORRECTION OF TUNING CURVE NON-LINEARITIES

[75] Inventors: William O. Camp, Jr., Ithaca; Dale E. Del Nero, Vestal, both of N.Y.; Charles N. Herbert, Rome, Pa.; John A. Marozas, Colchester, Vt.

[73] Assignee: International Business Machines Corporation, Armonk, N.Y.

[21] Appl. No.: 905,617

[22] Filed: Sep. 8, 1992

Related U.S. Application Data

[62] Division of Ser. No. 677,223, Mar. 29, 1991, Pat. No. 5,179,725.

[51] Int. Cl.⁵ .................. H03L 1/00; H03L 7/085
[52] U.S. Cl. ........................ 331/16; 331/19; 331/30; 331/40; 331/44
[58] Field of Search ............ 331/19, 30, 32, 33, 331/40, 41, 44, 16

[56] References Cited

U.S. PATENT DOCUMENTS

| | | | |
|---|---|---|---|
| 3,155,919 | 11/1964 | Baxter et al. | 331/19 |
| 3,427,561 | 2/1969 | Hamer | 331/19 |
| 4,442,412 | 4/1984 | Smith et al. | 331/17 X |
| 4,518,930 | 5/1985 | Rozema et al. | 331/177 V X |
| 4,568,888 | 2/1986 | Kimura et al. | 331/16 X |
| 4,728,906 | 3/1988 | Turl et al. | 331/19 X |
| 5,079,522 | 1/1992 | Owen et al. | 331/16 X |

Primary Examiner—Siegfried H. Grimm
Attorney, Agent, or Firm—Lynn L. Augspurger; William H. Steinberg

[57] ABSTRACT

A scanning-superhetrodyne ESM receiver having a VCO for a local oscillator which is linearized and temperature compensated. A stable combline oscillator is used to generate known frequency signals which are frequency converted to an intermediate frequency (IF) using the local oscillator and frequency converter (mixer). The frequency of each combine signal is measured and a table of known voltage/frequency points is generated. The table is input to a Cubic Spline program which computes the coefficients for the best-fit third order polynomial for each pair of data points. When a particular local oscillator frequency is desired, the corresponding tune voltage is computed by solving the polynomial equation for the given frequency range. By repeating the calibration on a periodic, or an "as needed" basis, temperature compensation is achieved.

5 Claims, 4 Drawing Sheets

PSEUDOCODE FOR CUBIC SPLINE FIT TO TRANSFER CURVE

SET OF TUNE VOLTAGES AND FREQUENCIES,
FREQUENCIES NOT NECESSARILY EVENLY SPACED.

| NUMBER | TUNE_VOLTAGE | FREQUENCY |
|---|---|---|
| n = 0 | V[0] | F[0] |
| 1 | V[1] | F[1] |
| 2 | V[2] | F[2] |
| . | . | . |
| N | V[N] | F[N] |

GENERATES 4 SETS OF COEFFICIENTS C[i] [NUMBER]

TO USE:

```
INPUT FREQUENCY
LOOP n FROM 0 TO N
    EXIT WHEN F[n] > OR = FREQUENCY
CALCULATE TUNE_VOLTAGE= C[1] [n] + (FREQUENCY - F[n]) *
                       (C[2] [n] + (FREQUENCY - F[n]) *
                       (C[3] [n] + (FREQUENCY - F[n]) *
                       C[4] [n]))
```

TO CALCULATE C's:

```
LOOP NUMBER FROM 0 TO N
    CALCULATE C[1][NUMBER] = V[NUMBER]
/* END POINT SLOPE = PIECEWISE BESSEL INTERPOLATION */
/* EQUIVALENT TO CONSTANT 2nd DERIVATIVE */
```

FIG.3A

CALCULATE C[2] [0] = ((F[2]-F[0])*(V[1]-V[0])/(F[1]-F[0])-
                     (F[1]-F[0]*(V[2]-V[0])/(F[2]-F[0]))/(F[2]-F[1])

CALCULATE C[2] [N] = SIMILAR
/* THE FOLLOWING IS A SERIES OF LOOPS WITH INTERMEDIATE CALCULATIONS */
/* MODIFIED GAUSS ELIMINATION SCHEME                                  */
/* MAKES USE OF TEMPORARY VECTORS DIFF AND DIAG                       */
SET DIFF[0] = 0;
SET DIAG[0] = 1;
LOOP n FROM 1 TO Nt CALCULATE
    DIFF[n] = F[n]-F[n-1]
    DIAG[n] = (C[1,n]-C[1,n-1])/DIFF[n]
LOOP n FROM 1 TO Nt-1 CALCULATE
    C[2,n] = 3*DIFF[n]*DIAG[n+1]+3*DIFF[n+1]*DIAG[n]
    DIAG[n] = 2*DIFF[n]+2*DIFF[n+1]
LOOP n FROM 1 to Nt-1 CALCULATE
    g = -DIFF[n+1]/DIAG[n-1]
    DIAG[n] = DIAG[n]+g*DIFF[n-1]
    C[2,n] = C[2,n]+g*C[2,n-1]
LOOP n FROM Nt-2 TO 1 CALCULATE
    C[2,n] = (C[2,n]-DIFF[n]*C[2,n+1])/DIAG[n]
LOOP n FROM 0 TO (Nt-1) CALCULATE
    C[3,n] = (C[2,n+1]+2*C[2n]-3*(C[1,n+1]-C[1,n])/(F[n+1]-F[n]))/(F[n+1]-F[n])
    C[4,n] = (C[2,n]+C[2,n+1]-2*(C[1,n+1]-C[1,n])/(F[n+1]-F[n]))/((F[n+1]-F[n])**2

FIG.3B

| FIG.3A |
| FIG.3B |

FIG.3

VOLTAGE CONTROLLED OSCILLATOR WITH CORRECTION OF TUNING CURVE NON-LINEARITIES

This is a division of application Ser. No. 07/677,223, filed Mar. 29, 1991, now U.S. Pat. No. 5,179,725.

FIELD OF THE INVENTION

This invention relates to voltage controlled oscillators, and particularly to a voltage controlled oscillator which is useful for ESM (Electronic Support Measures) receivers where both linearization and temperature compensation of the tune voltage input/frequency output transfer function are important considerations.

BACKGROUND OF THE INVENTION

Voltage controlled oscillators (VCO) generally have a non-linear tuning characteristic, which means that the transfer function between the tune voltage input and frequency output is non-linear. This tuning characteristic is commonly linearized and temperature compensated using PROMs (Programmable Read Only Memories).

An ESM receiver is often a scanning superheterodyne type receiver which is used to intercept and derive information from RF and microwave signals.

Most ESM Receivers require one or more VCOs to provide the function of the local oscillator. These systems require the voltage input/frequency output transfer function to be linearized and temperature compensated. This function has been traditionally implemented with PROMS or breakpoint generators. This is expensive in terms of hardware cost, testing time, and does not work if some component characteristic drifts with age. In addition, if certain components within the VCO fail, the calibration data in the PROM becomes invalid. New linearization and temperature compensation data must be retaken and input to the PROM.

The use of programmed control of a VCO with a varactor tuned filter has been illustrated in a number of U.S. Patents. U.S. Pat. No. 4,641,101, issued Feb. 3, 1987, to Harold N. Selim provided a VCO with a programmable tuner which generated voltages for two voltage dividers. A tuning curve was programmed in a RAM (Random Access Memory) with tuning voltage data values stored in memory to cause the dividers to follow the input. There the VCO tuning voltage was quantitized into sixteen steps.

This may be contrasted with the approach of shaping networks and PROMS incorporated into microprocessor controlled signal generators mentioned, along with thermistors for temperature correction, in U.S. Pat. No. 4,728,906, issued Mar. 1, 1988 to Turl et al. That patent controlled a varactor-tuned oscillator by using look-up tables for fine tuning with a program for a microprocessor to perform the various frequency establishing steps and calibration steps of the apparatus.

Microcomputers have been used to measure the frequency of an output from a VCO, as illustrated by U.S. Pat. No. 4,823,399 issued Apr. 18, 1989 to Ashok K. George.

Programmed tuning has been used in tuning television oscillators, as illustrated by the U.S. Patents to Rast et al., U.S. Pat. Nos. 4,078,212 issued Mar. 7, 1978 and 4,077,008 issued Feb. 28, 1978.

The aforesaid programmatical and hardware approaches are an expensive solution to linearizing a VCO throughout its frequency range and requires additional elements to handle temperature compensation.

SUMMARY OF THE INVENTIONS

Linearization and temperature compensation of a voltage controlled oscillator (VCO) may be accomplished using a stable combine or harmonic oscillator for generating known frequencies throughout the VCO tuning range, reducing not only the component cost but the time required for tuning. This solution provides a more suitable approach where an ESM system is involved, since a combline oscillator used in accordance with the preferred embodiment of the inventions may be already used for calibration and built-in-test (BIT) and does not constitute additional hardware.

The VCO tune voltage is adjusted under microprocessor control such that each combline frequency is sequentially down-converted to the center of the intermediate frequency (IF) passband of the receiver. Temporary data is collected on the VCO frequency and tune voltage.

The temporary data is utilized as input to the microprocessor and in accordance with our preferred embodiment the non-linear turning function is characterized with a third order polynomial, and this is repeated often enough that temperature compensation is not required. A Cubic Spline program is used to calibrate a specific desired frequency and the coefficients for the particular frequency range are used to generate a polynomial equation which is solved to determine the corresponding turning voltage. This permits implementation of the temperature compensation by rapid repetition of the complete calibration process when it is determined that the VCO tuning curve has drifted significantly from a previous calculation.

In accordance with the preferred embodiment of our inventions the drift is detected by periodically comparing the tune voltages corresponding to the combline frequencies to the tune voltages for the same comblines frequencies calculated during the previous calibration. The combline oscillator generates a series of stable harmonic frequency components, which the local oscillator sequentially converts to the same intermediate frequency and the calculated local oscillator frequency and the tune voltage may be stored in local memory.

The approach significantly reduces the recurring costs of VCO's with minimal impact on processor memory and processing time.

For a further description of the inventions, reference should be had to the following description and drawings.

BRIEF DESCRIPTION OF THE DRAWINGS

FIG. 3 consisting of FIGS. 3A and 3B is an illustration in Psuedo Code of the use of a Cubic Spline best fit polynomial function for linearization and temperature compensation of a VCO tuning characteristic.

DETAILED DESCRIPTION OF THE INVENTIONS

As previously stated, in an ESM receiver combline oscillators are used routinely. It does not constitute additional hardware to use this oscillator to generate known frequencies that may be used to calibrate the VCO, as may be seen by referring to our preferred embodiment illustrated by FIG. 1. In accordance with this embodiment a combline or harmonic oscillator 101 generates a series of stable frequency components which are harmonically related to a base frequency (i.e. Fbase, 2*Fbase, 3*Fbase . . . N*Fbase, where N is a positive integer and Fbase is a fixed frequency).

In accordance with out invention the VCO input voltage is adjusted until a combline signal is down-converted to the center of the IF passband. The input voltage and the computed VCO frequency are recorded in temporary memory. In accordance with the illustrated embodiment, the VCO frequency is computed knowing the combline frequency and the IF center frequency. This procedure is repeated in each repeated calibration for all combline frequencies and a table of voltage/frequency data points is generated.

We have improved the time of calibration by providing that the table of data points is provided as an input to a Cubic Spline program which generates the best fit, third order polynomial curve between each consecutive pair of data points. The output of the Cubic Spline program is a set of four polynomial coefficients for each pair of consecutive data points which can be used to describe the curve between the data points.

The advantage of the described preferred Cubic Spline program over an N-th order polynomial function which might have been used (such as the Lagrange Integration Polynomial) is in the ease of computation and the numerical accuracy. The Lagrange Integration Polynomial requires a polynomial with the same number of elements as the number of data points. Thus, if the combline oscillator has 38 discrete frequencies, a polynomial of degree 38 would need to be solved. This would be too time consuming for the microprocessor and could result in significant error if the coefficients are not carried out to many significant digits, so the Cubic Spline calibration offers a substantial improvement over this other possibility.

Once the Cubic Spline calibration is complete and a particular VCO frequency is desired, the coefficients for the particular frequency range which contains the desired frequency are used to generate a polynomial equation. The equation is solved to determine the corresponding tune voltage. Temperature compensation is achieved by periodically repeating the complete calibration process. The process is repeated when it is determined that the VCO tuning curve has drifted significantly from the previous calibration. The drift is detected by periodically comparing the tune voltages corresponding to the combline frequences to the tune voltages for the same comblines calculated during the previous calibration.

Figure 1:
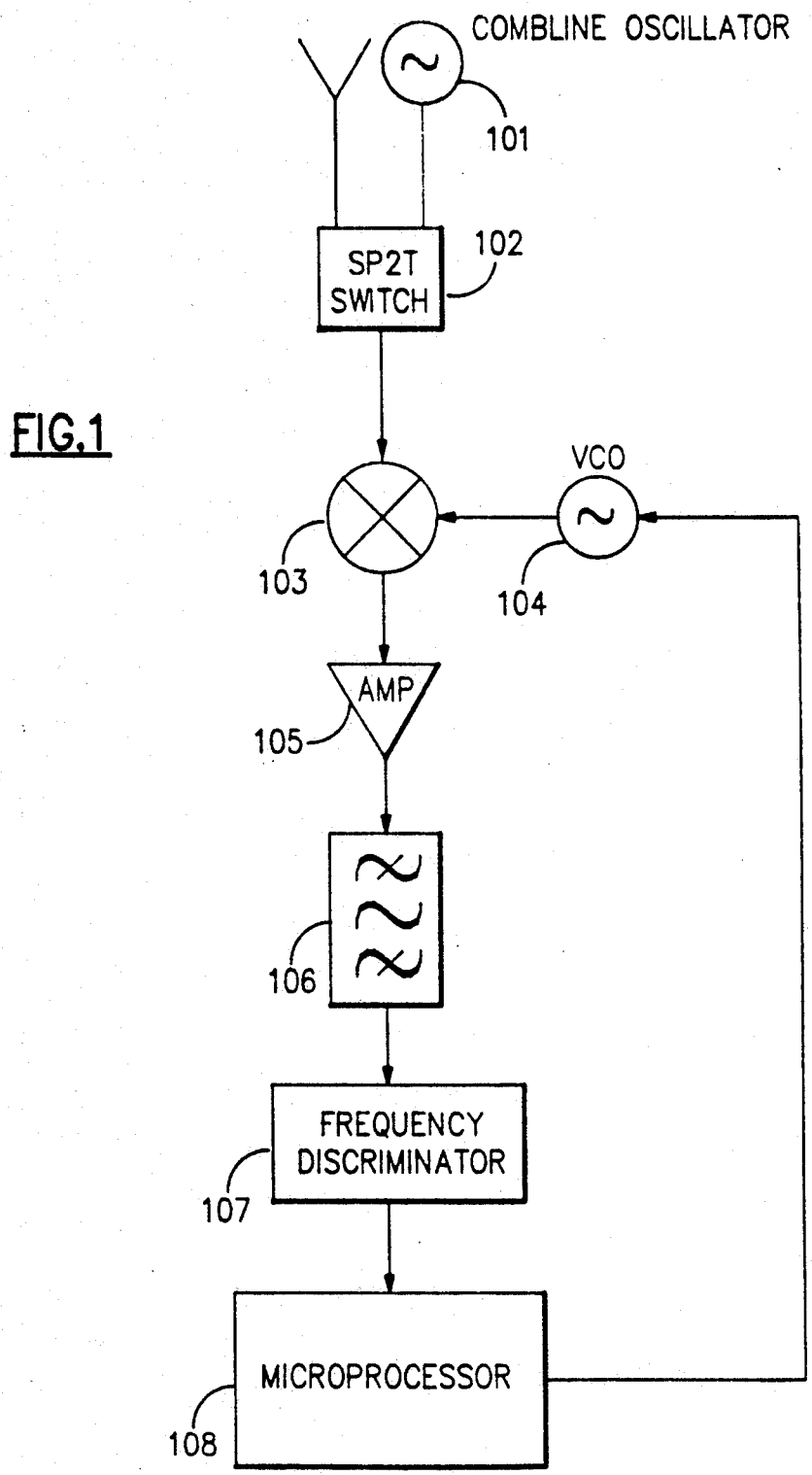
FIG. 1 illustrates schematically an ESM receiver incorporating the preferred embodiment of the inventions.

FIG. 1 illustrates schematically a scanning-superhetrodyne ESM receiver incorporating the preferred embodiment of the inventions. The preferred receiver will comprise a stable combline oscillator (101), a frequency converting device (103), a VCO (104) and a frequency measurement device (107). A VCO (104) will consist of a bipolar or field effect transistor used as a negative resistance element, with a voltage input and frequency output transfer characteristic.

In accordance with our preferred embodiment, we utilize the computational capabilities of the frequency measurement device (107) to compensate for temperature fluctuations. The method of linearizing and compensating for temperature fluctuations which we employs uses the voltage/frequency transfer characteristic of a VCO using a stable combline frequency source to generate known voltage/frequency points. The set of points is input to a Cubic Spline program which creates the coefficients of a set of polynomial curves that together characterize the transfer curve of the VCO as computed by a microprocessor (108). With this method of temperature compensating the VCO transfer curve is determined by repeating the entire calibration procedure periodically whenever the known voltage/frequency points have drifted by an unacceptable amount.

A preferred scanning superhetrodyne ESM receiver is provided, with the circuit schematically coupled as illustrated in FIG. 1. A single-pole, double throw switch (102) is used to select either the receiver input (usually an antenna) or the combline oscillator (101). During VCO linearization, the switch (102) is connected to the combline oscillator position. The mixer (103), IF amplifier (105), and the bandpass filter (106) are used to convert the combline frequencies to an IF frequency that is measurable by the frequency discriminator (107). The mixer mixes or converts each stable frequency component (N*FBASE) of the combline oscillator sequentially to an intermediate frequency (IF) using the VCO (104) as a local oscillator. The frequency discriminator (107) measures the intermediate frequency after amplification. A VCO (104) is provided having a transistor coupled as a negative resistance element and having a voltage input, frequency output transfer characteristic. The VCO may have either a bi-polar or field effect transistor. The VCO (104) is used as the local oscillator input to the mixer (103) and receives its tune voltage command from a microprocessor (108). This microprocessor (108) adjusts the tune voltage input to the VCO such that each combline frequency is sequentially converted to the same intermediate frequency and the calculated local oscillator frequency and tune voltage stored in temporary memory. The local oscillator frequency (Flo) is calculated using the known combline frequency (Fcomb) and the known intermediate frequency (Fif) as Flo=Fcomb+/−Fif where the + sign is used if the combline frequency is below the local oscillator frequency and the − sign is used if the combline frequency is above the local oscillator frequency.

Figure 2:
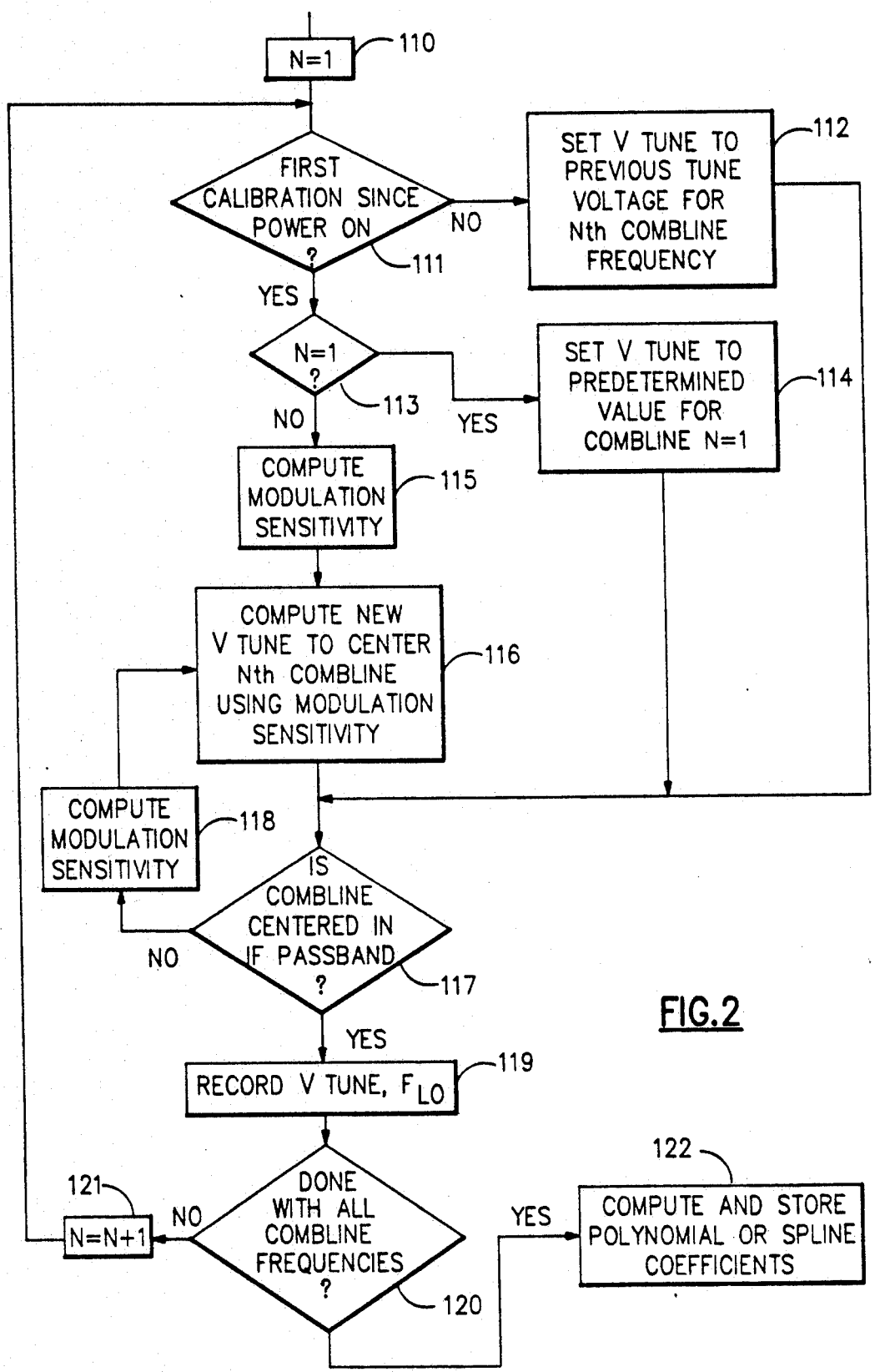
FIG. 2 is flow chart of the corrective program for the receiver.

FIG. 2 is a flow chart of the corrective program for the receiver. The process starts with power up of the receiver whereupon the microprocessor (108) resets the combline counter to the first combline frequency N=1 (110). The first calibration following receiver power up is different from all subsequent calibrations. During the first calibration, the system must find all the combline frequencies knowing only the tune voltage of the first combline. Once the first calibration is complete and all tune voltages corresponding to the combline frequencies are known, all subsequent calibrations use the known combline tune voltages as a starting point for centering the signals in the IF passband. The process (111) decides if the calibration is the first calibration following application of power. If it is, the tune voltage is set to either the predetermined voltage for the first combline (114) if the first combline is being calibrated; or, the modulation sensitivity is computed in process (113) if it is not the first combline frequency. Computing the modulation sensitivity (or slope of the frequency out/voltage in curve) is performed in both process (115) and (118). This process involves recording the tune voltage/frequency output point (V1,F1) then adjusting the tune voltage a fixed amount and recording the second voltage/frequency point (V2,F2). The modulation sensitivity is then computed as (F2−F1)/(V2−V1). Process (116) computes the tune voltage required to center the Nth combline in the IF bandpass. At this point in the program, the microprocessor (108) has attempted to center the Nth combline in the IF passband. Processes (117), (118), and (116) from a repetitive loop wherein the combline signal is adjusted to the center of the IF passband. At this point, the tune voltage/frequency data point may be recorded in process (119). If all combline data points have been taken, the Cubic Spline coefficients are computed and stored in process (122). If the combline frequencies have not been completed, the combline counter is incremented in process (121) and the process is repeated starting at (111).

FIG. 3 composed of FIGS. 3A and 3B is an illustration in pseudo code showing the calculation of the Cubic Spline coefficients (122) using the voltage/frequency points as inputs. As the illustrated code is self explanatory, no further discussion will be needed at this point.

It will be appreciated by those skilled in the art, that having described our preferred embodiment of our inventions, that various improvements and modifications may be made, both now and in the future, and that such modifications will be within the scope of our claimed inventions.

What is claimed is:

1. A system for linearization and temperature compensation of a tune voltage versus frequency transfer function of a voltage controlled oscillator (VCO) comprising:
    a combline or harmonic oscillator means for generating a series of stable frequency components which are harmonically related to a base frequency;
    a voltage controlled oscillator (VCO);
    mixing means coupled to the output of said oscillator means and said VCO for mixing said outputs to provide sequential intermediate frequencies for each of the oscillator means series of stable frequency components;
    means for measuring the intermediate frequency provided by said mixing means;
    means for adjusting the voltage provided to said VCO to control the VCO frequency, so that each of said stable frequency components provided by said oscillator means is sequentially converted to the same intermediate frequency by said mixing means; and
    means for determining the VCO frequency from the intermediate frequency and the oscillator frequency for each of the series of stable frequency components and storing the voltage provided to the VCO and the corresponding determined VCO frequency.

2. The system of claim 1 wherein the VCO frequency (Flo) is determined using the known oscillator means frequency (Fcomb) and a known intermediate frequency (Fif) provided by said mixing means according to the formula Flo=Fcomb+/−Fif, where addition of Fif is used if the oscillator means frequency is below the VCO frequency and Fif is subtracted if the oscillator means frequency is above the VCO frequency.

3. A method of linearizing and compensating for temperature fluctuations of the voltage versus frequency transfer characteristic of a VCO comprising the steps of:
    (a) adjusting the input voltage supplied to the VCO to obtain a series of output frequencies to generate a set of known voltage and frequency points for the VCO;
    (b) employing the set of points as input to a cubic spline fit program of a processor means to create the coefficients of a set of polynomial curves, with one curve between each consecutive pair of voltage and frequency points, that together characterize the voltage versus frequency transfer curve of the VCO;
    (c) determining which coefficients are needed for the frequency range which contains a desired VCO frequency for generating a polynomial equation; and
    (d) determining a required input voltage to the VCO for obtaining the desired frequency by solving the polynomial equation having the coefficients for the particular frequency range which contains the desired frequency.

4. The method of claim 3 further comprising the step of: periodically repeating steps a and b during operation of the VCO to compensate for temperature fluctuations of the VCO characteristics prior to performing steps c and d.

5. The method of claim 3 wherein said adjusting step further comprises using said VCO as a local oscillator for mixing with a series of known frequencies which are harmonically related to a base frequency, adjusting said VCO voltage to achieve the same intermediate frequency for each of said series of frequencies, and determining said VCO frequency from said known intermediate frequency and said known series of frequencies.

* * * * *